Patented Mar. 7, 1939

2,149,963

UNITED STATES PATENT OFFICE 2,149,963

SOLDERING FLUX AND PROCESS OF FLUXING

William H. Holst, Tamaqua, Pa., assignor to Atlas Powder Company, Wilmington, Del., a corporation of Delaware No Drawing. Application February 4, 1938,
Serial No. 188,697

13 Claims. (Cl. 148—23)

This invention relates to the art of fluxing metals and in particular to a process of fluxing and to soldering fluxes for metals which may ordinarily be soldered.

An object of the invention is to provide a fluxing agent which is non-corrosive at ordinary temperatures and which is very active at soldering temperatures.

Another object of the invention is to provide a fluxing agent which is non-hygroscopic and yet quite soluble in ordinary organic solvents such as acetone, alcohol, etc.

Still another object is to provide a process of fluxing and a fluxing agent which enable quick penetration of the joints to be soldered and dissolution of the oxide film usually existing on metals, thereby to provide a chemically clean metallic surface which will permit itself to be wetted easily by the solder.

A further object of the invention is to provide a flux which is non-toxic and may be used in the soldering of containers for shipments of food, and which will not decompose to materials which will either interfere with the process of soldering or cause objectionable odors at the time of application. This invention further provides for the use of an organic material which will not decompose to carbon at either the fluxing or soldering temperature.

Other objects of the invention will hereinafter more fully appear.

One essential for satisfactory soldering of one metal to another is that the metals to be soldered must be thoroughly cleaned as the strength of the soldered joint depends upon the adhesion resulting from the intimate contact between the solder and the surface of the metal soldered. The solder must wet the surface and wetting is perfect only when solder and surface are chemically clean and when conditions of relative surface tension between the solder and the surface are satisfactory. The layer of oxide on the metals to be joined should be removed and the oxide-free metallic surfaces protected until wetting by the solder has occurred. Consequently, the flux should not only have the ability to clean the solder and the surfaces to be soldered, but should also have the ability to maintain this condition of cleanliness up to the soldering temperature.

Heretofore, fluxes used to prepare a chemically clean surface have been acids or their salts, such as muriatic acid and zinc chloride, or materials such as rosin. The former compounds react with the oxides of the surfaces to be soldered, but have the objectionable features that they are corrosive under normal conditions and in some cases toxic. In the case of rosin, the chief objectionable feature is its sluggishness, although it too serves as a solvent for metallic oxides. The surfaces which have been soldered with the aid of such fluxes must be thoroughly cleaned after the process of soldering is finished so that after-corrosion is eliminated. Another essential of good soldering practice is that water be eliminated because it may remain in crevices of the two metals soldered and cause after-corrosion, and in the case of fluxes composed of salts containing water of crystallization, it is necessary that the water be eliminated before effective work can be done by the molten salts. Water also may form bubbles of vapors which may be trapped within the solder thereby weakening the finished joint.

It is further essential to good soldering that wetting of the metals by solder should commence at the instant that the solder alloy melts, and consequently the flux should melt below the melting point of the solder so as to react with the oxide coated metal surfaces. For example, if the melting point of a tin-lead solder is 180° C., it is essential that the flux melt below this temperature so as to react with the oxide coated metal surfaces and remove the oxide before the melting point of the solder is reached. For this reason, zinc chloride which melts at 262° C. is not entirely satisfactory, for while the aqueous solution flux will melt below the melting point of the zinc chloride, the evaporation of the water leaves in the joints particles of solid zinc chloride which melt at approximately 80° above the melting point of the solder. Then, too, bubbles may form in the solder because of the water, thereby weakening the joint. A satisfactory flux should quickly penetrate the joints and quickly react with the oxide surface, and it is for this reason that most fluxes have been used either in the molten state or in water solution.

Now I have discovered that mannitol triacetonate is a very satisfactory flux for soldering metallic surfaces. Mannitol triacetonate is a crystalline material which melts at 68–69° C. It is quite soluble in ordinary organic solvents such as acetone, alcohol, ether, chloroform, carbon tetrachloride, etc., but very sparingly soluble in water. It is non-hygroscopic and non-corrosive at normal temperatures and is quite stable under ordinary conditions. However, in the presence of traces of acid and water, and at elevated temperatures, it is partially hydrolyzed to the lower acetonates of mannitol and acetone, or completely hydrolyzed to mannitol and acetone. Thus, a composition of 6.25 grams of mannitol triacetonate and 0.1 gram of citric acid dissolved in 78.7 grams of acetone showed no sign of decomposition at room temperature and only a slight turbidity after being heated to the boiling point of acetone (57–60° C.). When the volatiles were driven off by heating the composition to 190–200° C. for approximately five minutes, however, after the partial decomposition of the mannitol triacetonate, about 10% of the mannitol triacetonate had decomposed to deposit mannitol. It is this characteristic that makes mannitol triacetonate especially suitable as a flux when mixed with acid, for it then undergoes decomposition to form mannitol at the temperature of soldering. Preferably, the acid is present in sufficient amount to produce a solution with a pH below 6.5, as determined directly from the solution with a Beckman pH meter.

Thus, mannitol triacetonate can be used as means of introducing mannitol into a non-aqueous flux without using a suspension. This will insure an even distribution of the flux throughout the entire soldering joint and permit penetration into all of the minute crevices. This factor also enables the soldering operation to be performed at a higher speed, thereby preventing waste of time and material.

The formula of mannitol triacetonate is:

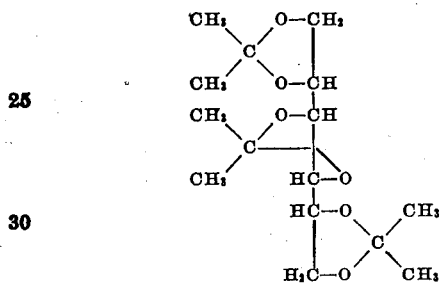

It is easily prepared as is illustrated by the following example:

Example 1

66 grams of mannitol are mixed with 1 liter of technical acetone to which is added 15 ml. of concentrated sulfuric acid, specific gravity 1.84. This mixture is stirred at room temperature (25° C.) until all of the mannitol has dissolved. The acid is then neutralized by the addition of an excess of solid sodium bicarbonate. After filtering off the inorganic salts, the mannitol triacetonate is recovered from the filtrate by pouring it into a mixture of 1000 g. water and 1000 g. of ice, yielding 63 grams of crystalline product, M. P. 68–69° C. This represents 60% of the theoretical yield. This product, when recrystallized from 65% alcohol, yields a product having a melting point of 68.5°–69° C.

In the following non-limiting examples of soldering fluxes of the present invention, the quantities represent parts by weight.

| Example | Rosin | Mannitol triacetonate | 95% ethyl alcohol U. S. P. | Technical acetone |
|---|---|---|---|---|
| 2 | 5.0 | 1.25 | | 78.7 |
| 3 | 4.5 | 1.75 | | 78.7 |
| 4 | 4.0 | 2.25 | | 78.7 |
| 5 | 3.25 | 3.25 | | 78.7 |
| 6 | 3.0 | 1.5 | | 78.7 |
| 7 | 3.0 | 1.0 | | 78.7 |
| 8 | 1.5 | 1.5 | | 78.7 |
| 9 | 6.0 | 3.0 | | 78.7 |
| 10 | 3.0 | 1.5 | 80.6 | |
| 11 | 3.0 | 1.0 | 80.6 | |
| 12 | 1.5 | 1.5 | 80.6 | |
| 13 | | 3.0 | 80.6 | |
| 14 | | 4.5 | 80.6 | |

The compositions of the foregoing examples were prepared by dissolution of the materials in the solvent.

Non-limiting examples of the application of soldering fluxes of the present invention are as follows:

Example 15

Bridge wires, similar to those used in the manufacture of electric detonators, and made of an alloy consisting of 80% nickel and 20% chromium, were soldered to brass and cupro-nickel with the aid of the soldering flux of Example 2. The diameter of the nickel-chromium bridge wire was 0.0015 in. The brass and cupro-nickel parts were dipped in the flux and allowed to dry prior to soldering. The soldering was superior to a comparative operation in which an acetone solution of rosin alone had been employed, in speed of operation as well as in the firmness of attachment and appearance at the joints.

This procedure, when repeated with the fluxes of Examples 3, 4 and 5, also produced superior results.

Example 16

Pieces of sheet tin were soldered together using a 50–50 lead-tin solder. The flux of Example 6 was poured upon the pieces of tin and the molten solder allowed to run between them and set. Again the speed of operation, as well as the strength and appearance at the joint, was superior to a comparative operation in which an acetone solution of rosin alone had been employed.

This procedure was repeated with the fluxes of Examples 7, 8, 10, 11 and 12 with similar results.

Example 17

Bodies of tin cans were prepared on conventional crimping machines. These can bodies were then allowed to stand at one end on a felt pad saturated with the flux of Example 9 for about 10 seconds, this being followed by a dipping of that end of the cans in molten solder to a depth of about ¾ in. This process was repeated with the opposite end of the cans. The cans were then placed on a conveyer which carried them through lighted gas jets, directed at the upper half of the solder line so that the solder melted and flowed into the seam, thus sealing the can. The side seam of the can was soldered by hand with the use of the flux of Example 9. The speed of operation and the appearance of the joints were superior to those of a comparative operation in which an acetone solution of rosin alone had been employed.

This procedure was repeated with the fluxes of Examples 6 and 12, with similar results.

Example 18

The soldering of cans with the flux of Example 10 was carried out in the same manner as described in Example 17 except that no pad was used in the application of the flux, but instead the can was dipped directly into the flux to a depth of about ⅛ in. The soldering was superior to a comparative operation in which an acetone solution of rosin alone had been employed, in speed of operation as well as in appearance at the joints.

This procedure was repeated with the fluxes of Examples 13 and 14 with similar results.

Of the foregoing examples, it has been found that the solutions of mannitol triacetonate and rosin are preferable. When the latter flux is employed in soldering, the mannitol triacetonate undergoes partial, if not complete, hydrolysis. The solvent and the acetone resulting from the hydrolysis of mannitol triacetonate are volatilized at or below the soldering temperature, leaving some mannitol and the rosin to assist in the necessary fluxing of the metallic surfaces. A flux comprising about 4.5 parts by weight of rosin and about 1.75 parts by weight of mannitol triacetonate dissolved in 75 to 85 parts by weight of acetone is a highly preferred embodiment of the invention.

However, the invention in its broad aspect is not to be considered as limited in this respect as a solution of mannitol triacetonate alone (Examples 13 and 14) gives good results and is highly advantageous where delicate parts of equipment such as electrical instruments and the like are being soldered and it is desired that no acid residue be left on the soldered parts. Furthermore, other acids such as acetic, citric or formic acid, may be employed with the mannitol triacetonate if so desired. For example, a composition comprising 6.25 grams of mannitol triacetonate and 0.1 gram of citric acid dissolved in 78.6 grams of acetone, and having a pH of about 4, when employed in the soldering of bridge wires as in Example 15, gave excellent results. In this specification and in the appended claims, by pH is meant the pH as determined with a Beckman pH-meter directly upon the solution, using a glass electrode.

Accordingly, the invention is not to be considered as restricted to the particular materials or proportions of the examples as it is apparent that many variations of the compositions may be used. The invention includes within its purview any modification falling within either the terms or the spirit of the appended claims.

What I claim is as follows:

1. A soldering flux comprising mannitol triacetonate.
2. A soldering flux comprising mannitol triacetonate dissolved in a non-aqueous organic solvent.
3. As a soldering flux, a solution comprising mannitol triacetonate dissolved in a non-aqueous organic solvent, said solution having a pH below 6.5.
4. As a soldering flux, a solution comprising mannitol triacetonate and an organic acid dissolved in a non-aqueous organic solvent, said solution having a pH below 6.5.
5. As a soldering flux, a solution comprising mannitol triacetonate and rosin dissolved in acetone, said solution having a pH below 6.5.
6. As a soldering flux, a solution comprising mannitol triacetonate and rosin dissolved in a non-aqueous, organic solvent, the components of said solution being present in about the following proportions:—

|  | Parts by weight |
|---|---|
| Mannitol triacetonate | 1.75 |
| Rosin | 4.5 |
| Solvent | 75 to 85 |

7. As a soldering flux, a solution as defined in claim 6 and in which the solvent is acetone.
8. A process of fluxing metal which comprises applying mannitol triacetonate to the surface of the metal and raising the temperature of the mannitol triacetonate until at least a portion of the mannitol triacetonate decomposes and deposits mannitol upon the said surface.
9. A process of fluxing metal which comprises applying a solution of mannitol triacetonate dissolved in a non-aqueous organic solvent to the surface of the metal, and raising the temperature of the solution until at least a portion of the mannitol triacetonate decomposes and deposits mannitol on the said surface.
10. A process of fluxing metal which comprises applying a solution of mannitol triacetonate dissolved in a non-aqueous organic solvent, said solution having a pH below 6.5, to the surface of the metal, and raising the temperature of the solution until at least a portion of the mannitol triacetonate decomposes and deposits mannitol on the said surface.
11. A process of fluxing metal which comprises applying a solution of mannitol triacetonate and an organic acid dissolved in a non-aqueous organic solvent, said solution having a pH below 6.5, to the surface of the metal, and raising the temperature of the solution until the solvent evaporates and at least a portion of the mannitol triacetonate decomposes and deposits mannitol on the said surface.
12. A process of fluxing metal which comprises applying a solution of mannitol triacetonate and rosin dissolved in a non-aqueous organic solvent, said solution having a pH below 6.5, to the surface of the metal, and raising the temperature of the solution until the solvent evaporates and at least a portion of the mannitol triacetonate decomposes, to thereby deposit mannitol and rosin on the said surface.
13. A process of fluxing metal which comprises applying a solution of mannitol triacetonate and rosin dissolved in acetone, said solution having a pH below 6.5, to the surface of the metal, and raising the temperature of the solution until the acetone evaporates and at least a portion of the mannitol triacetonate decomposes, to thereby deposit mannitol and rosin on the said surface.

WILLIAM H. HOLST.